(12) United States Patent
Gustafsson (10) Patent No.: US 11,275,979 B2
(45) Date of Patent: Mar. 15, 2022

(54) NOTE BACKED BY CRYPTOCURRENCY

(71) Applicant: Olof Kyros Gustafsson, Dubai (AE)

(72) Inventor: Olof Kyros Gustafsson, Dubai (AE)

( * ) Notice: Subject to any disclaimer, the term of this patent is extended or adjusted under 35 U.S.C. 154(b) by 579 days.

(21) Appl. No.: 16/104,864

(22) Filed: Aug. 17, 2018

(65) Prior Publication Data
US 2021/0312252 A1    Oct. 7, 2021

(51) Int. Cl.
*G06K 19/06* (2006.01)
*B42D 25/29* (2014.01)
*B42D 25/305* (2014.01)
*G06Q 20/06* (2012.01)

(52) U.S. Cl.
CPC ..... *G06K 19/06065* (2013.01); *G06Q 20/065* (2013.01)

(58) Field of Classification Search
CPC .. G06Q 20/1085; G06Q 20/042; G06Q 40/12; G06Q 20/00; G06Q 20/06; G06Q 20/363; G06Q 40/04; G06Q 40/06; G06Q 20/108; G06Q 40/02; G06Q 20/065; G06Q 20/10; G06Q 20/18; G06Q 20/405; G06Q 20/102; G07D 7/12; G07D 7/0043; G07D 2207/00; G07D 11/50; G07D 7/0047; G07D 11/30; G07D 7/003; G07D 11/12; G06K 19/047; G06K 19/07749; G06K 19/06065; G06K 19/0723; G06K 9/00; G06K 2009/0059

USPC ........ 235/379, 380, 375, 487, 491, 381, 492
See application file for complete search history.

(56) References Cited

U.S. PATENT DOCUMENTS

| | | | | |
|---|---|---|---|---|
| 6,830,192 B1 * | 12/2004 | Krul | ....................... | G06K 19/02 235/492 |
| 2001/0013481 A1 * | 8/2001 | Lang | ...................... | B42D 3/002 206/425 |
| 2020/0294011 A1 * | 9/2020 | Robertson | ............... | H04L 63/06 |
| 2020/0372497 A1 * | 11/2020 | Stradal | ............... | G06Q 20/3678 |

* cited by examiner

*Primary Examiner* — Thien T Mai
(74) *Attorney, Agent, or Firm* — The Rapacke Law Group P.A (57) ABSTRACT

In an embodiment, a note for use as currency is provided. The note includes a base material having a first surface and a second surface opposite first surface. The note further includes identifying indicators printed on the first surface and the second surface providing an indication of a type and value of the note. The note also includes a first unique identifier printed on the note and a second unique identifier on the note. The note further includes a removable cover applied over the second unique identifier on one of the first surface and the second surface of the note. The note also includes an opaque backing applied over the second identifier on the note, the opaque backing applied to a surface of the note opposite the surface of the removable cover.

19 Claims, 7 Drawing Sheets

NOTE BACKED BY CRYPTOCURRENCY

BACKGROUND

Currency as a form of legal tender for debts permits governments to stabilize and simplify commerce. It also provides a convenient medium of exchange for individuals and businesses. Simply paying cash for a purchase is the easiest way to complete a transaction in most situations.

However, currency has various limitations. For example, counterfeit currency can often be produced at a fraction of the nominal value of the currency. This potentially yields far-reaching effects. Not only is an individual inconvenienced when counterfeit currency ruins a transaction, but follow-on effects come into play as well. Lack of faith in a currency due to counterfeiting can destabilize the markets depending on that currency, and can eventually wreak havoc with government functions overall as the money supply fails to live up to its main purpose.

Thus, it can be useful to provide a form of currency which can be validated. Some responses to this situation involve various indicia of validity incorporated into a bill, such as security strips, watermarks, holographic features and other measures. However, these responses do not provide for third-party validation of currency, only for a check on validity of a bill or note based on physical features. Finding a way to allow for validation based on an authoritative third party can allow for greater confidence in physical currency, while still providing flexibility in transactions.

BRIEF DESCRIPTION OF THE DRAWINGS

The present invention is illustrated by way of example in the accompanying drawings. The drawings should be understood as illustrative rather than limiting.

DETAILED DESCRIPTION

A system, method and apparatus is provided for a note backed by cryptocurrency. The specific embodiments described in this document represent example instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
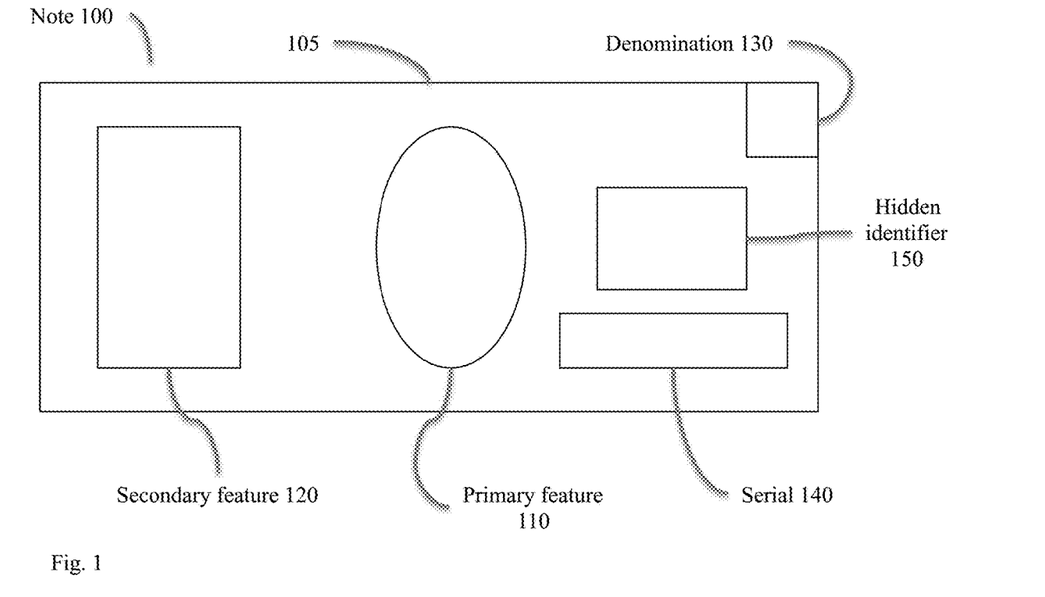
FIG. 1 illustrates an embodiment of a note in a front view.

FIG. 1 illustrates an embodiment of a note in a front view. Note or bill 100 includes features for identifying the type of bill, features for identifying the validity of the bill, and a denomination. For example, primary feature 110 is provided and may be a portrait or a picture of a location in an embodiment. Additionally, secondary feature 120 is provided and may be a watermark or other feature which corresponds to primary feature 110, and may typically have a pictorial nature as well. These features provide a visual indication of the type of note used. Denomination 130 provides an indication of the stored value of a note. Denomination 130 may or may not ultimately correspond to the actual value of the note 100, depending on usage of the note 100. Each of these features, 110, 120 and 130 are provided on a front surface 105 of the note, or are observable on the front surface 105 of the note.

Note 100 may be made of typical materials such as cotton or linen thread woven to form note 100, for example, some form of paper, or some other material such as a durable plastic. Note 100 may also have embedded security features, such as a security strip, microprinting, holographic printed features, or other security features. Moreover, note 100 may have other design elements provided for a range of purposes including aesthetic considerations and security features, for example. A signature of an official or a year of printing may be provided, for example.

Note 100 also includes a serial number 140, shown on front surface 105. The serial number 140 may be expected to be unique to a given instance or copy of the note 100, although this may also be varied by the issuer of the note 100. Note 100 further includes hidden identifier 150. Hidden identifier 150 includes a cover material and a backing material, and may include a further overlay or additional material adhered to note 100 in some instances. Hidden identifier 150 is shown as visible on the front surface 105 of note 100, but it may also be visible from the back surface 205 of note 100, or both surfaces in some embodiments. Hidden identifier 150 includes an identifier such as a unique QR (quick response) code, bar code, or other encoded format. The identifier of hidden identifier 150 is recorded in conjunction with the serial number 140 of note 100 at the time of issuance, and the value of the note 100 is stored on the note 100 by virtue of the presence of hidden identifier 150. At the time of issuance, or in conjunction therewith, the identifier of hidden identifier 150 is recorded in a blockchain such as that of a cryptocurrency (e.g. Bitcoin or another cryptocurrency) or a blockchain chosen as authoritative by the issuer of the note 100. Thus, the value of hidden identifier 150 may be verified later by a third party. Hidden identifier 150 is covered on both sides by opaque coverings to prevent misuse. The identifier of hidden identifier is either printed or otherwise provided on the surface of note 100, or is applied, such as through an adhered surface to the surface of note 100.

Figure 2:
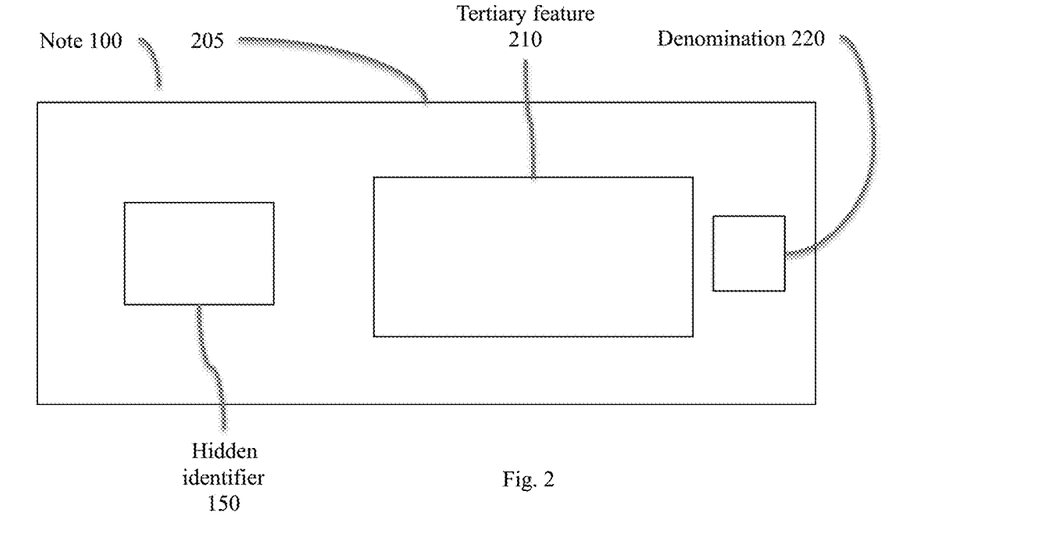
FIG. 2 illustrates an embodiment of a note in a back view.

Considering the back surface of note 100, FIG. 2 illustrates an embodiment of a note in a back view. Back surface 205 is shown providing a tertiary factor 210, such as an image which is associated with the note 100. Denomination 220 is also provided to identify the intended value of the note 100. Moreover, the back side of hidden identifier 150 is shown as illustrated. As with front surface 105, back surface 205 may include other features of various types. Moreover, both front surface 105 and back surface 205 may have information applied in various ways, such as printing, embossing, or otherwise applying information to the surfaces 105 and 205 of note 100.

Figure 3:
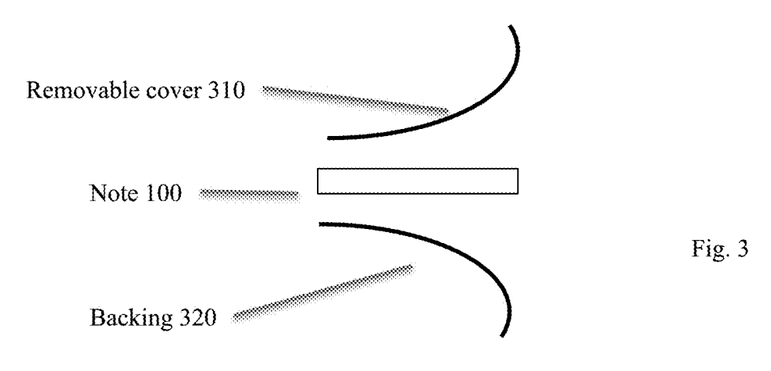
FIG. 3 illustrates the embodiment of the note of FIG. 1 with a close up view of the hidden identifier.
Figure 4:
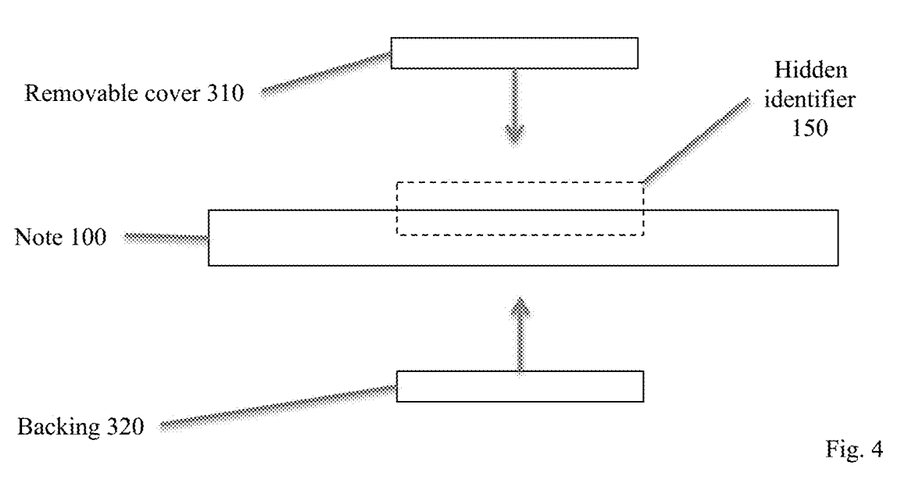
FIG. 4 illustrates the embodiment of the note of FIG. 1 with an alternate close up view of the hidden identifier.

Hidden identifier 150 provides a specific security feature which enhances the prospects for note or bill 100. FIG. 3 illustrates the embodiment of the note of FIG. 1 with a close up view of the hidden identifier. Removable cover 310 is provided on top of one surface of bill 100, allowing one to expose the hidden identifier 150. Backing 320 is provided on the back of hidden identifier 150 in order to essentially eliminate the possibility of reading hidden identifier through the other surface of note 100. FIG. 4 illustrates the embodiment of the note of FIG. 1 with an alternate close up view of the hidden identifier. Hidden identifier 150 is applied to note 100, and removable cover 310 is placed on top of hidden identifier 150. Backing 320 is placed below where hidden identifier 150 is placed on note 100. Removable cover 310 may be an opaque material such as a plastic or paper material, which is adhered to note 100, and potentially adhered to hidden identifier 150 as well. Backing 320 is also an opaque material which is adhered to note 100 behind hidden identifier 150.

Hidden identifier 150 may be provided to cover a hole in note 100, or applied to a surface of note 100. If a hole in a note (not shown) is covered, this would potentially be a hole initially provided in note 100 as part of preparing note 100, for example. In more typical embodiments, hidden identifier 150 will either be printed on to note 100 on one of its surfaces, or may be applied to note 100 as an attached separate piece of material, such as plastic or paper with and adhesive on one side. Removable cover 310 is intended to be removable in a tamper-evident manner. It may be a cover of a material such as plastic or paper that is adhered, or it may be printed or applied in some other fashion on top of hidden identifier 150, such as a coating which may be scratched off, for example.

Additionally, in some embodiments, the hidden identifier may be provided without the tamper-proof front and back. In such embodiments, the secrecy of the second identifier of the two identifiers on the note or bill is not considered as important as the ability to further verify the type of bill. Regardless of whether a hidden identifier 150 is covered or not, it may be of a variety of different forms, such as a QR (quick response) code, UPC (Universal Product Code) barcode, another type of barcode, a series of digits and/or alphanumeric characters, or some other form of unique identification for an identifier. Similarly, the serial number 140 may be provided as a series of digits or alphanumeric digits, a barcode such as a UPC code, a QR code, or some other unique identifier.

Figure 5:
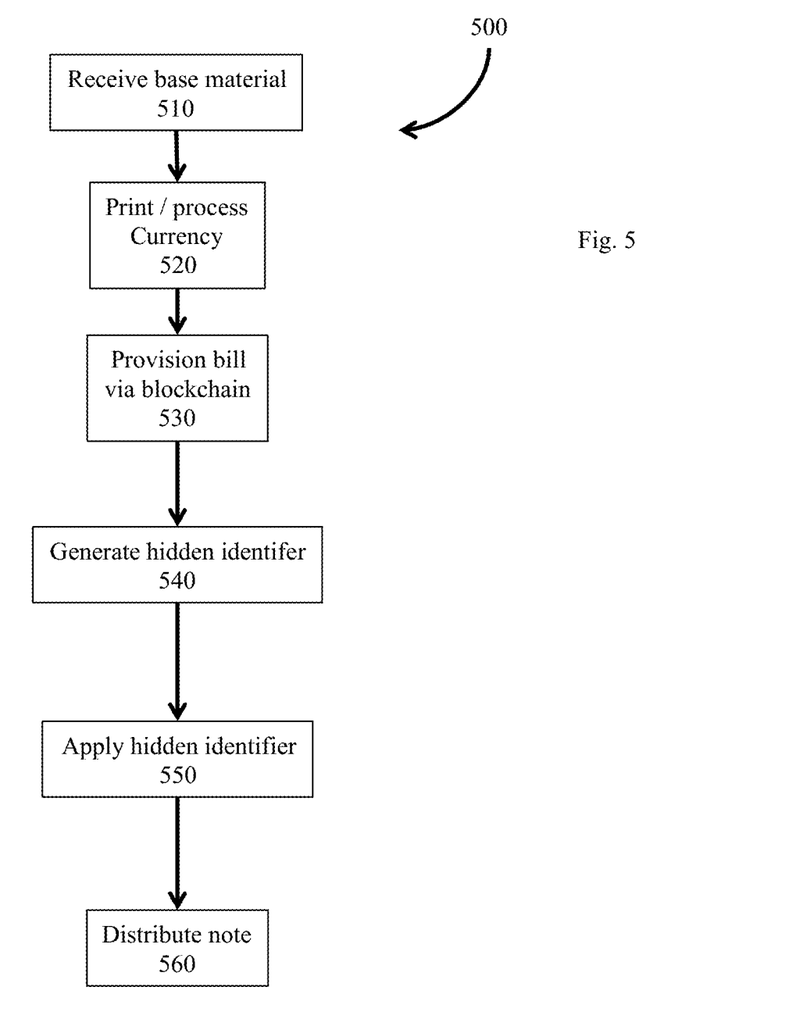
FIG. 5 illustrates an embodiment of a process of provisioning a note.

Various processes may be used for making a note such as note 100 or other embodiments of a note as described herein. FIG. 5 illustrates an embodiment of a process of provisioning a note. Process 500 is presented as a set of steps or modules which may potentially be rearranged or reordered, and executed in a stepwise linear fashion, executed in parallel, or in some combination of linear and parallel execution. Process 500 initiates with module 510 and receipt of base material of a note. At module 520, the note is printed or otherwise processed to form currency, including providing for any standard visual features of the note such as identifying information and security features, for example.

At module 530, the note is provisioned by associating a serial number or first identifier such as serial number 140 of the note with a second identifier such as a hidden identifier of the note. The second identifier is recorded in association with the first identifier in a blockchain system selected as authoritative by an issuer of the note. Thus, the blockchain system may be that associated with bitcoin, for example, or any other cryptocurrency, or may be a blockchain system otherwise provided for. Recording with the blockchain of bitcoin, for example, or any other cryptocurrency, may occur through a transaction using bitcoin, or any other cryptocurrency, with the first and second identifiers recorded as part of the transaction. This recording then allows for third-party verification by checking the hidden identifier (second identifier) is properly recorded against the first identifier (e.g. serial number) when one seeks to use the value of the note.

At module 540, a hidden identifier is generated which provides the second identifier which was recorded against the first identifier (e.g. a serial number of the note). At module 550, the hidden identifier is applied to the note such as through printing on the note or applying an adhesive backed material embodying the hidden identifier on the note. Moreover, at module 550, the hidden identifier is further obscured by applying the backing and cover for the hidden identifier. At module 560, the complete note is distributed, such as to a consumer facing bank for circulation.

Figure 6:
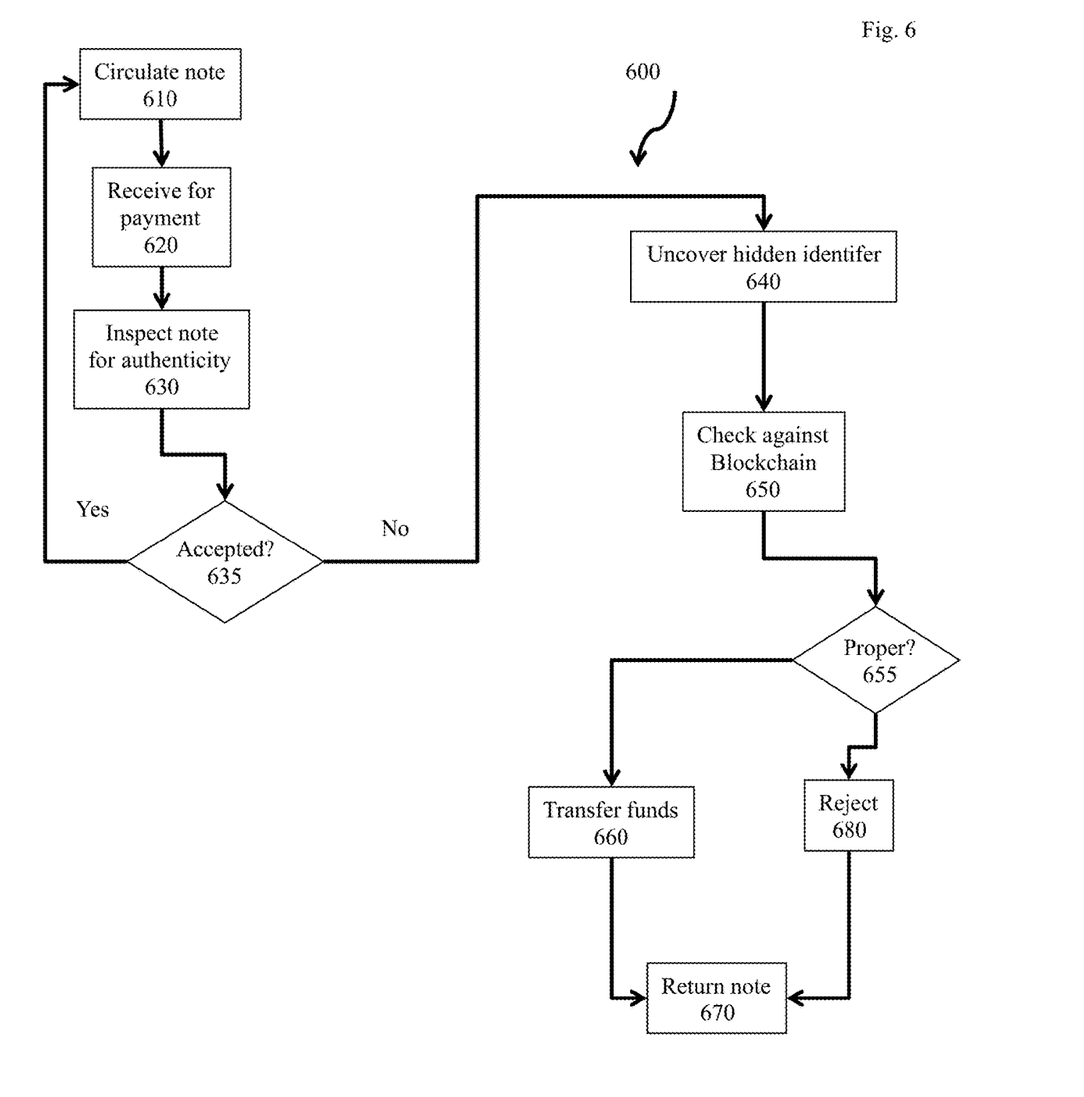
FIG. 6 illustrates an embodiment of a process of using a note.

With the note ready for circulation, use of the note can occur. FIG. 6 illustrates an embodiment of a process of using a note. Process 600, like process 500, is presented as a set of steps or modules which may potentially be rearranged or reordered, and executed in a stepwise linear fashion, executed in parallel, or in some combination of linear and parallel execution. Process 600 initiates at module 610 with circulation of a note or bill. At module 620, the note is received for payment, such as by a consumer or merchant. At module 630, the note is inspected for authenticity. This may be as simple as checking that the various features of the note appear correct. However, it may also involve special checking of features visible under ultraviolet light or checking of reactivity or lack thereof of the note to a known substance, for example. It may also involve looking up a serial number visible on the note to check for presence on a list of known bad serial numbers or known good serial numbers, for example. Such a list may be publicly accessible from a central bank, for example. If the note or bill is acceptable, this is determined at module 635 based on the check of module 630, and the note may then be circulated further at module 610 in other commerce, for example. Moreover, the note may be part of a transaction where goods are delivered or fulfilled, or services are provided or fulfilled, for example.

If the note is not considered sufficiently authenticated, a choice may be made at module 635 to not simply accept the note, but to check the hidden identifier. For embodiments, where the hidden identifier is tamper-resistant or tamper-proof, this may effectively destroy the value of the note. At module 640, the hidden identifier is uncovered. At module 650, the user checks the hidden identifier against the recorded blockchain transaction for the hidden identifier and serial number, for example. This may involve referencing information provided by an issuing authority such as a central bank, for example. Alternatively, the process may involve searching the ledgers of the blockchain or otherwise querying the blockchain to find the transaction independently. Additionally, the blockchain registration information is checked for any further transactions which transfer the funds associated with the hidden identifier and the serial number. At module 655, results of the check of module 650 are evaluated to determine if the hidden identifier and serial number or first identifier and second identifier were properly recorded in the applicable blockchain and the value is still available (not further transferred). If they were, then at module 660, the funds from the transaction may be transferred through a further transaction on the blockchain, exhausting the funds backing the note. Alternatively, if the initial transaction provisioning the note is not found, or a further transaction exhausting the note is found, then the note may be rejected at module 680 as no longer having any value associated with it. Regardless, once the hidden identifier has been used and the value is either transferred or found to be lacking, at module 670, the note may be returned to a central authority as having had the value of the note transferred and thereby no longer having the same value available for circulation. In some embodiments, users may choose to circulate notes that have value exhausted as well, with the removal of tamper-evident cover showing the status of the note, for example.

Figure 7:
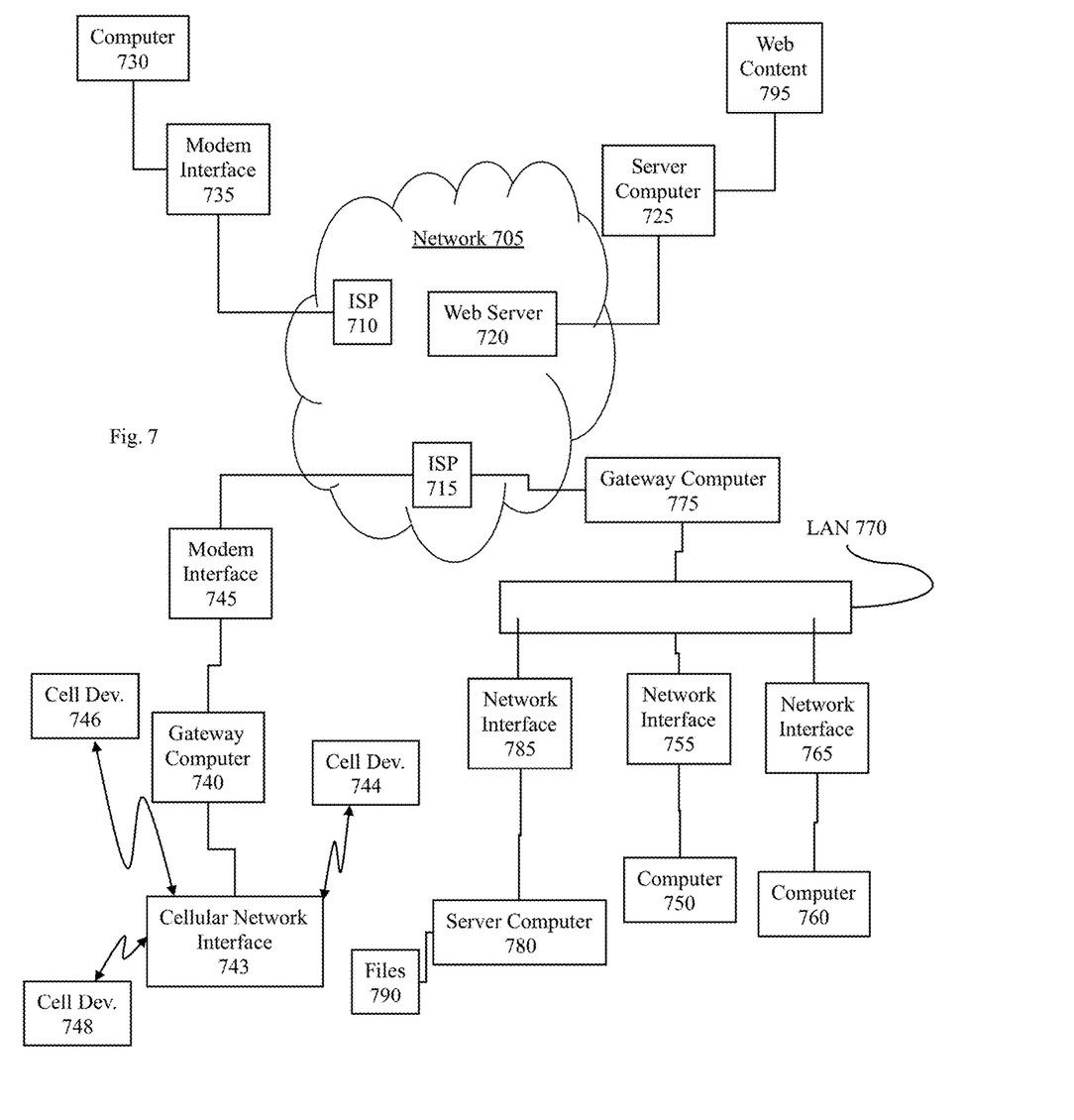
FIG. 7 illustrates an embodiment of a network or system which may be used as part of or in association with a system such as that of FIG. 9.
Figure 8:
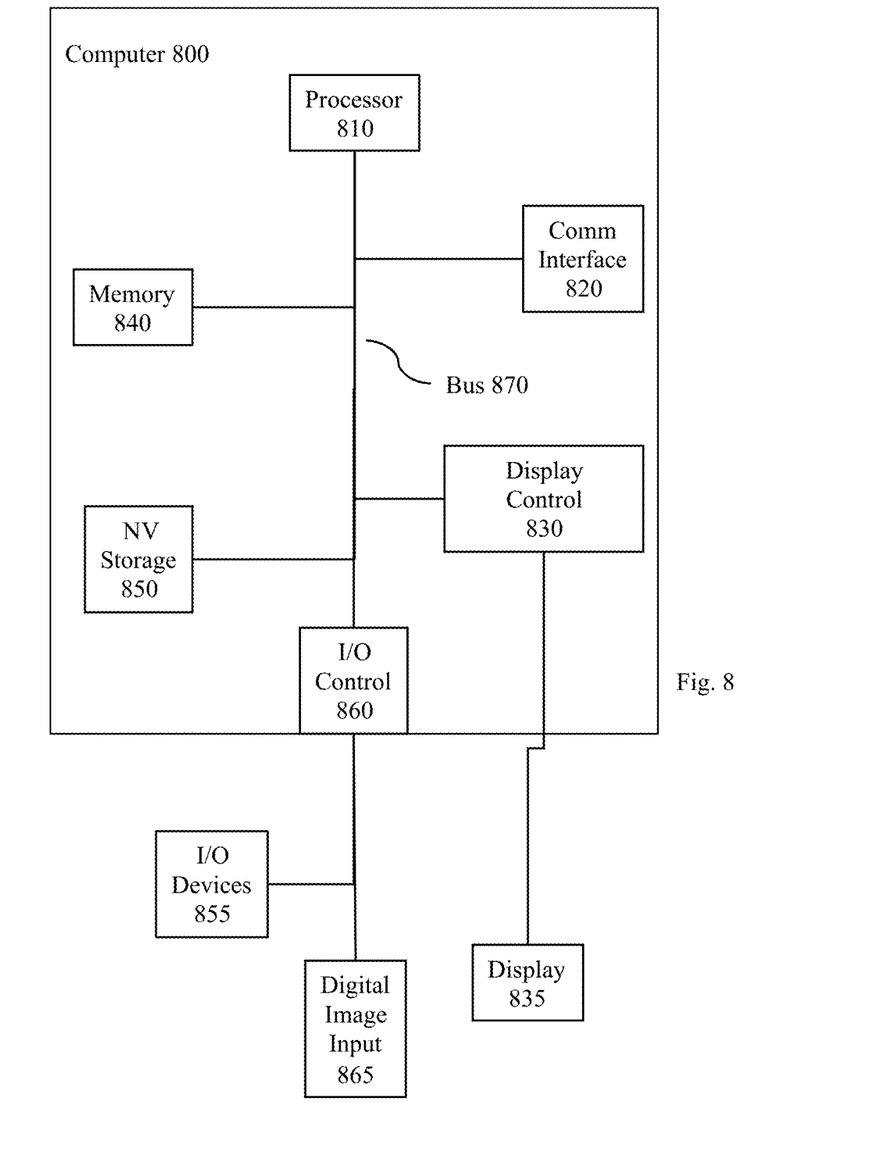
FIG. 8 illustrates an embodiment of a device which may be used as part of a system or network.
Figure 9:
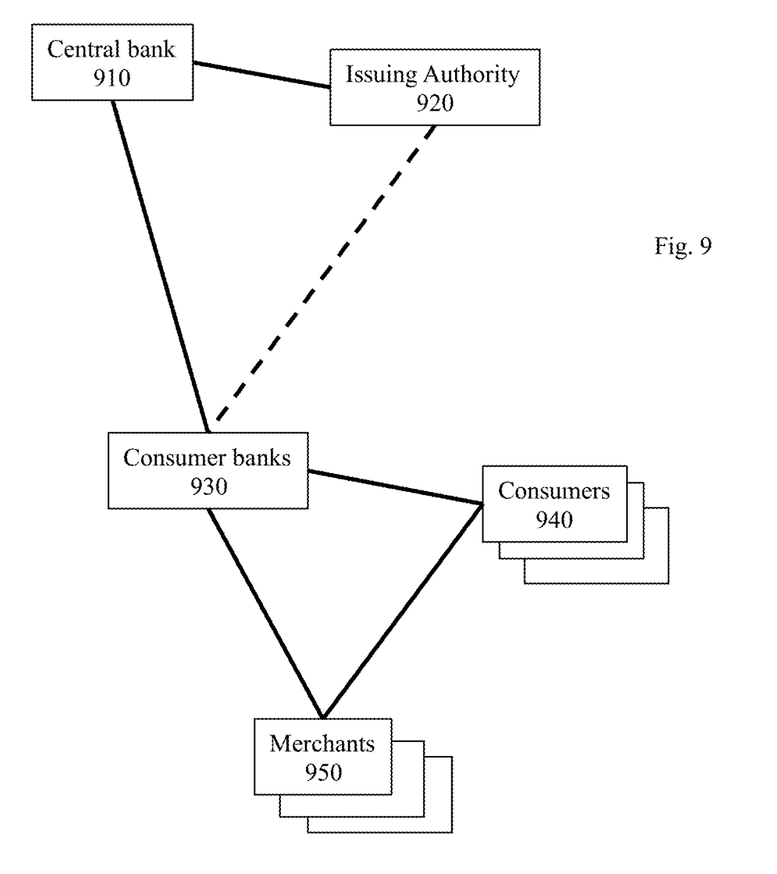
FIG. 9 illustrates a system in which a note may be used.

FIG. 7 illustrates an embodiment of a network or system which may be used as part of or in association with a system such as that of FIG. 9. FIG. 8 illustrates an embodiment of a device which may be used as part of a system or network. The following description of FIGS. 7-8 is intended to provide an overview of device hardware and other operating components suitable for performing the methods of the invention described above and hereafter, but is not intended to limit the applicable environments. Similarly, the hardware and other operating components may be suitable as part of the apparatuses described above. The invention can be practiced with other system configurations, including personal computers, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet, along with a cellular or other wireless network and related cellular or other wireless devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Cellular network interface 743 provides an interface between a cellular network and corresponding cellular devices 744, 746 and 748 on one side, and network 705 on the other side. Thus cellular devices 744, 746 and 748, which may be personal devices including cellular telephones, two-way pagers, personal digital assistants or other similar devices, may connect with network 705 and exchange information such as email, content, or HTTP-formatted data, for example.

Cellular network interface 743 is representative of wireless networking in general. In various embodiments, such an interface may also be implemented as a wireless interface such as a Bluetooth interface, IEEE 802.11 interface, or some other form of wireless network. Similarly, devices such as devices 744, 746 and 748 may be implemented to communicate via the Bluetooth or 802.11 protocols, for example. Other dedicated wireless networks may also be implemented in a similar fashion.

Cellular network interface 743 is coupled to computer 740, which communicates with network 705 through modem interface 745. Computer 740 may be a personal computer, server computer or the like, and serves as a gateway. Thus, computer 740 may be similar to client computers 750 and 760 or to gateway computer 775, for example. Software or content may then be uploaded or downloaded through the connection provided by interface 743, computer 740 and modem 745.

Client computer systems 730, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 750 and 760, although as shown in FIG. 7, the connections are not the same as for more directly connected computer systems. Client computer systems 750 and 760 are part of a LAN coupled through a gateway computer 775. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a personal device that can be used as a cellular telephone (744, 746 or 748) or similar personal device, or may be used as a more conventional personal computer, as an embedded processor or local console, or as a PDA, for example. Such a device can be used to perform many functions depending on implementation, such as monitoring functions, user interface functions, telephone communications, two-way pager communications, personal organizing, or similar functions. The system 800 of FIG. 8 may also be used to implement other devices such as a personal computer, network computer, or other similar systems. The computer system 800 interfaces to external systems through the communications interface 820. In a cellular telephone, this interface is typically a radio interface for communication with a cellular network, and may also include some form of cabled interface for use with an immediately available personal computer. In a two-way pager, the communications interface 820 is typically a radio interface for communication with a data transmission network, but may similarly include a cabled or cradled interface as well. In a personal digital assistant, communications interface 820 typically includes a cradled or cabled interface, and may also include some form of radio interface such as a Bluetooth or 802.11 interface, or a cellular radio interface for example.

The computer system 800 includes a processor 810, which can be a conventional microprocessor such as an Intel pentium microprocessor or Motorola power PC microprocessor, a Texas Instruments digital signal processor, or some combination of the various types or processors. Memory 840 is coupled to the processor 810 by a bus 870. Memory 840 can be dynamic random access memory (dram) and can also include static ram (sram), or may include FLASH EEPROM, too. The bus 870 couples the processor 810 to the memory 840, also to non-volatile storage 850, to display controller 830, and to the input/output (I/O) controller 860. Note that the display controller 830 and I/O controller 860 may be integrated together, and the display may also provide input.

The display controller 830 controls in the conventional manner a display on a display device 835 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" includes any type of storage device that is accessible by the processor 810 and also encompasses a carrier wave that encodes a data signal. Alternatively, a physical medium may be used as a machine-readable medium or computer-readable medium.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which includes a file management system, such as a disk operating system, which is part of the operating system software. One example of an operating system software with its associated file management system software is the family of operating systems known as Windows CE® and Windows® from Microsoft Corporation of Redmond, Wash., and their associated file management systems. Another example of an operating system software with its associated file management system software is the Chrome® operating system and its associated file management system, along with the MacOS® system, for example. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, Windows® or Chrome® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The overall system in which a note operates may further be understood with reference to the type of entities using the note. FIG. 9 illustrates a system in which a note may be used. A central bank 910 provisions notes and provides them to consumer banks 930. An issuing authority 920 such as a mint, treasury, or bureau of engraving, may be involved as well. Collectively, the central bank 910 and issuing authority 920 may be expected to provide funds recorded in a blockchain transfer such as a bitcoin transaction to back the value of a note. These funds may be in bitcoin, for example, or another blockchain-based currency, for example. Consumer banks 930 provide the notes in circulation to consumers 940 and merchants 950, which collectively exchange the notes in commerce. This may or may not require exhausting the note in any given transaction, but allows for checking the note against blockchain transactions as part of the circulation process.

One skilled in the art will appreciate that although specific examples and embodiments of the system and methods have been described for purposes of illustration, various modifications can be made without deviating from present invention. For example, embodiments of the present invention may be applied to many different types of notes in different formats, currencies, and with different associated cryptocurrencies, for example. Moreover, features of one embodiment may be incorporated into other embodiments, even where those features are not described together in a single embodiment within the present document.

What is claimed is:

1. A note for use as currency, comprising:
a base material having a first surface and a second surface opposite the first surface;
identifying indicators printed on the first surface and the second surface providing an indication of a type and value of the note;
a first unique identifier printed on the note;
a second unique identifier on the note;
a removable cover applied over the second unique identifier on one of the first surface and the second surface of the note; and
an opaque backing applied over the second unique identifier on the note, the opaque backing applied to a surface of the note that is opposite the surface on which the removable cover is applied.

2. The note of claim 1, wherein:
the first unique identifier and the second unique identifier are recorded in a transaction associating a predetermined amount of a cryptocurrency with the note in a recordation facility accessible for validation of the cryptocurrency.

3. The note of claim 1, wherein:
features of the note are recorded in a transaction associating a predetermined amount of a cryptocurrency with the note in a recordation facility accessible for validation of the cryptocurrency.

4. The note of claim 3, wherein:
the features of the note recorded in the transaction associating the predetermined amount of the cryptocurrency with the note include the second unique identifier.

5. The note of claim 3, wherein:
the features of the note recorded in the transaction associating the predetermined amount of the cryptocurrency with the note include the second unique identifier and a year of issuance of the note.

6. The note of claim 5, wherein:
the features of the note recorded in the transaction associating the predetermined amount of the cryptocurrency with the note include the first unique identifier.

7. The note of claim 1, further comprising:
a security feature embedded in the note, the security feature separate from the first unique identifier and the second unique identifier.

8. The note of claim 7, further comprising:
a secondary security feature embedded in the note.

9. The note of claim 1, further comprising:
a denomination provided on the base material.

10. The note of claim 1, further comprising:
an issuing authority identifier provided on the base material.

11. The note of claim 1, further comprising:
a security feature embedded in the note, the security feature separate from the first unique identifier and the second unique identifier;
a denomination provided on the base material;
an issuing authority identifier provided on the base material;
and
a year of issuance identifier provided on the base material.

12. The note of claim 1, further comprising:
a watermark provided on the base material;
a portrait provided on the base material;
an image provided on the base material;
and
a signature provided on the base material.

13. The note of claim 12, wherein:
the first unique identifier and the second unique identifier are recorded in a transaction associating a predetermined amount of a cryptocurrency with the note in a recordation facility accessible for validation of the cryptocurrency.

14. The note of claim 1, wherein:
the note is backed by a predetermined amount of cryptocurrency through a transaction associating the predetermined amount of cryptocurrency with the first unique identifier and the second unique identifier.

15. The note of claim 1, wherein:
the note is backed by a predetermined amount of cryptocurrency.

16. The note of claim 1, wherein:
the first unique identifier is provided on a front side of the note.

17. The note of claim 1, wherein:
the second unique identifier is provided on a front side of the note.

18. The note of claim 1, wherein:
the second unique identifier is provided on a back side of the note.

19. A note for use as currency, comprising:
a base material having a first surface and a second surface opposite the first surface;
identifying indicators printed on the first surface and the second surface providing an indication of a type and value of the note;
a first unique identifier printed on the note;
a second unique identifier on the note;
a removable cover applied over the second unique identifier on one of the first surface and the second surface of the note;
an opaque backing applied over the second unique identifier on the note, the opaque backing applied to a surface of the note that is opposite the surface on which the removable cover is applied;
a security feature embedded in the note, the security feature separate from the first unique identifier and the second unique identifier;
a denomination provided on the base material;
an issuing authority identifier provided on the base material;
a year of issuance identifier provided on the base material;
a watermark provided on the base material;
a portrait provided on the base material;
an image provided on the base material; and
a signature provided on the base material;
and
wherein the first unique identifier and the second unique identifier are recorded in a transaction associating a predetermined amount of a cryptocurrency with the note in a recordation facility accessible for validation of the cryptocurrency.

* * * * *